Figure 1:
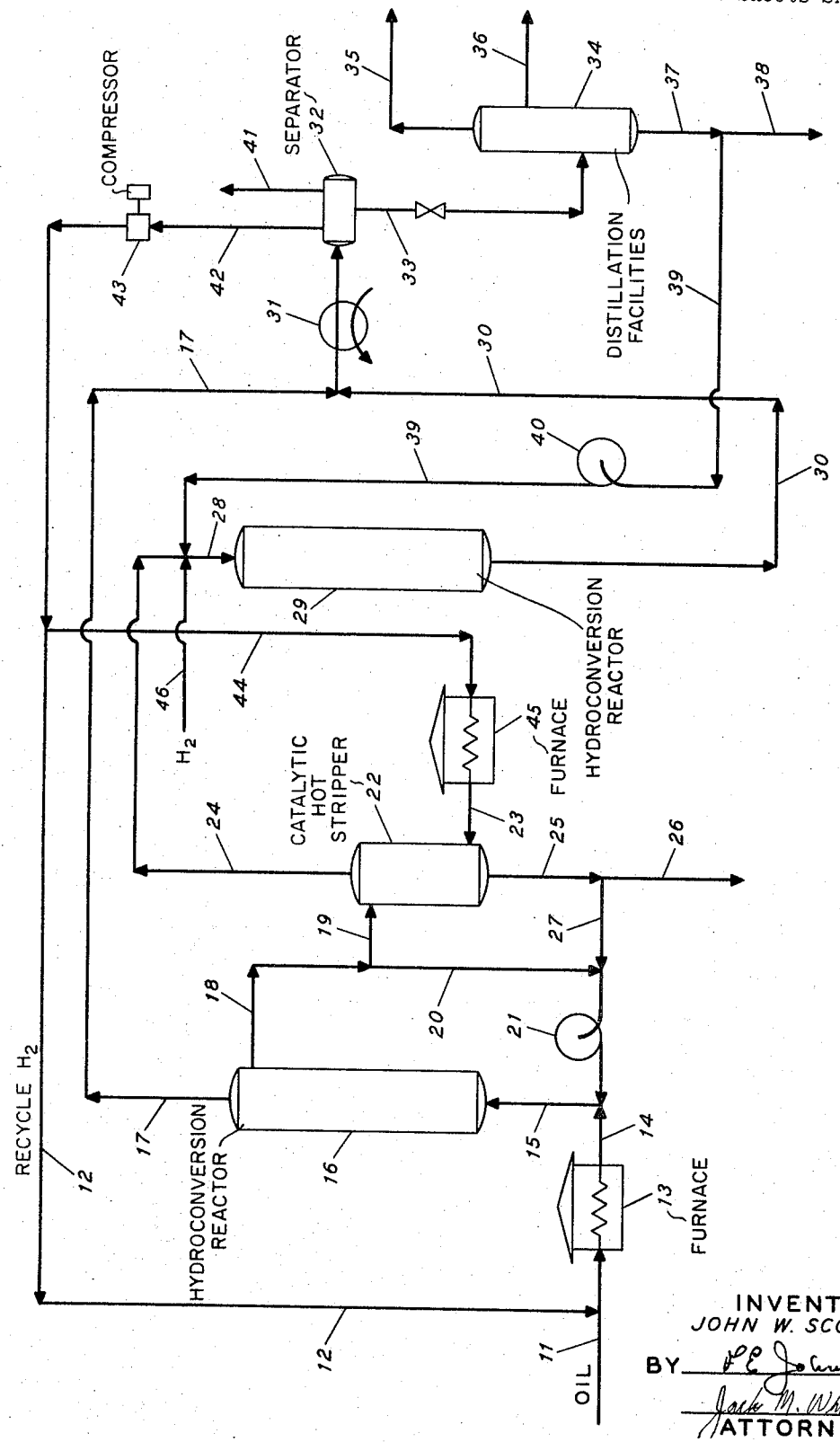

Jan. 23, 1968   J. W. SCOTT, JR   3,365,388
MULTISTAGE RESIDUUM HYDROCONVERSION PROCESS
Filed June 8, 1965   2 Sheets-Sheet 1

INVENTOR
JOHN W. SCOTT, JR.
BY
ATTORNEYS

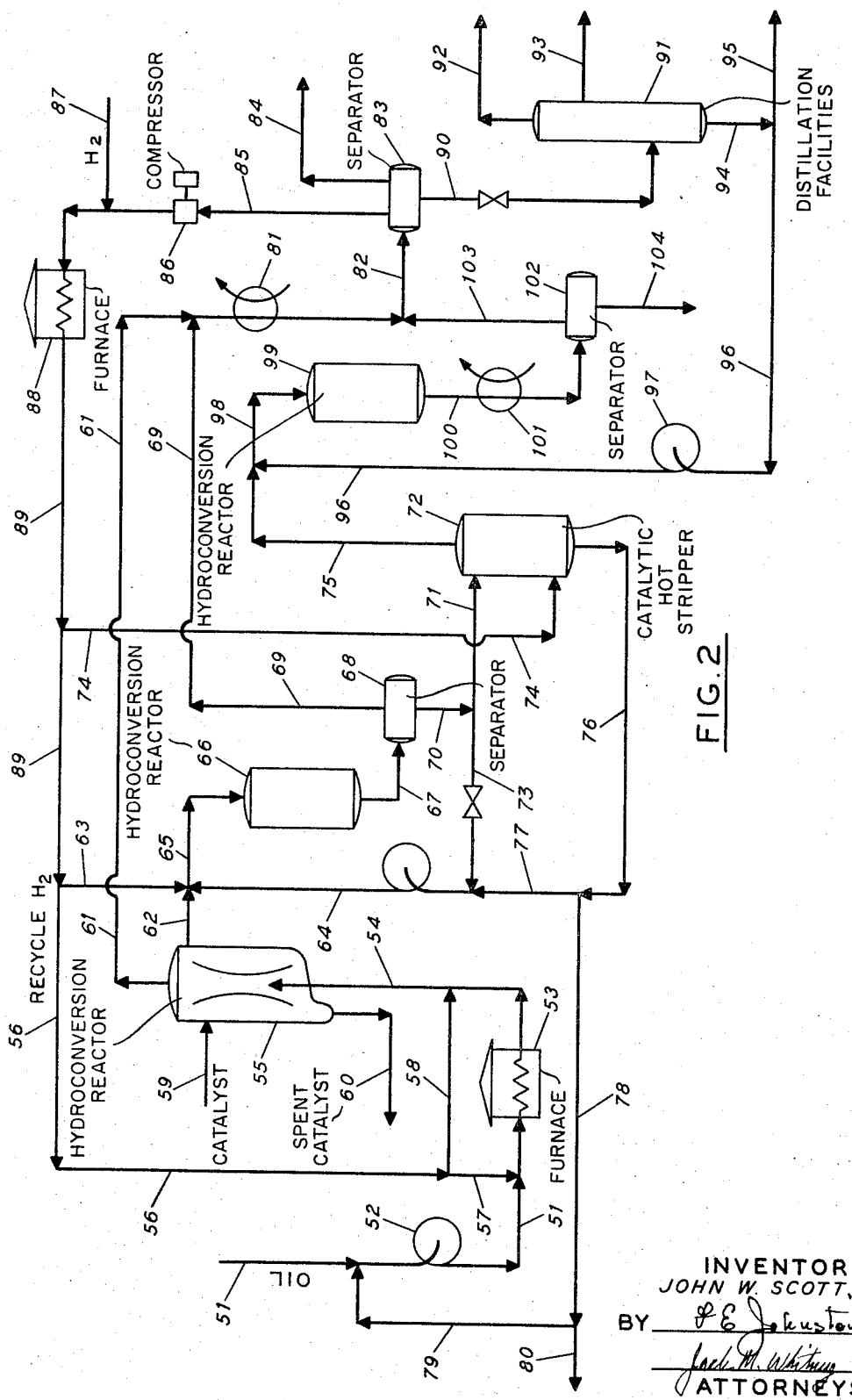

United States Patent Office 3,365,388
Patented Jan. 23, 1968

3,365,388
MULTISTAGE RESIDUUM HYDROCONVERSION PROCESS
John W. Scott, Jr., Ross, Calif., assignor to Chevron Research Company, a corporation of Delaware
Filed June 8, 1965, Ser. No. 462,220
7 Claims. (Cl. 208—59)

This invention relates to processes for converting the highest boiling portions of crude petroleum and like hydrocarbonaceous materials to lower boiling distillate oils. More particularly, the invention relates to processes for converting high boiling oils to lower boiling oils by the action of hydrogen at elevated temperature and pressure.

The price paid for various crude oils reflects both availability and the cost of upgrading the particular crude to salable products. Thus, low gravity crudes containing large amounts of sulfur and metal compound contaminants command a lower price than lighter, premium quality, crudes because a relatively small yield of distillates is obtainable by simple distillation, the distillates usually need further purification treatment to make salable products, and a large portion of the crude is comprised of high boiling contaminated residuals boiling above about 1000° F. which are not readily upgraded. The availability of low quality crudes is so great, however, that their price would remain low even if the economics of upgrading could be improved. Consequently, the incentive to upgrade such residuals is very great, but new and better processes are needed to overcome the difficult problems which arise.

The present invention is concerned with providing a new process whereby such contaminated residuals can be converted to distillates in high yield and the distillates be further upgraded and purified. The process of this invention permits obtaining substantial conversion of heavy oils including tar sands, shale oils, petroleum residua, and residuum fractions which are characterized by high molecular weights, and which are contaminated by metaloorganic compounds and often by salts, clay, silt, tramp iron and the like as well. Improved results and economies are obtainable in a continuous multi-stage process by the novel application of elution steps which avoid the need for intermediate heating, cooling, depressuring, and repressuring required in processes heretofore suggested for upgrading these problem materials.

Briefly, in accordance with the present invention, residual oil is upgraded by treating with hydrogen in seriallyconnected hydroconversion stages operated at elevated temperature within a single high pressure envelope. At least three serially-connected hydroconversion stages are employed, and in the case of the most highly contaminated residuals, a fourth stage is also employed. In the first hydroconversion stage, whole residuum is treated in a reaction vessel through which liquid oil is passed as the continuous phase and hydrogen-containing gas is passed as a discontinuous phase. In the second hydroconversion stage, liquid effluent of the first stage is treated in a reaction vessel through which liquid oil is passed as a discontinuous phase and hydrogen-containing gas is passed as the continuous phase. In the last hydroconversion stage, vapor effluent of the next-to-last stage is treated in a reaction vessel containing a sulfactive hydrogenation catalyst through which the said vapor effluent is passed. The effluent of the last hydroconversion stage is cooled to obtain a vapor effluent and a liquid effluent. In the next-to-last stage liquid effluent of a preceding stage is passed downward through a stripping reaction vessel over catalytic surfaces and contacted in countercurrent flow with upflowing hydrogen-containing gas.

Where only three serially-connected stages are employed, the next-to-last stripping reaction vessel, or catalytic hot stripper, is the second stage. Where four seriallyconnected hydroconversion stages are employed, the stripping reaction vessel is the third stage. In both cases the vapor effluent of the first stage and the vapor effluent of any second stage which is prior to the next-to-last stage are cooled to condense distillate oils contained therein. At least the highest boiling distillates so condensed are treated in the last hydroconversion stage, said distillates bypassing all intervening stages. The uncondensed portions and low-boiling condensed distillates bypass all stages subsequent to the stage from which they were derived.

By operating in this way, a large portion of the metal compounds in the residual feed can be removed in the first stage and prevented from contaminating catalysts employed in subsequent stages. Also, tramp materials including silt, scale, and salts can be eliminated. Higher conversions can be achieved in the second and subsequent stages with less danger of plugging or fouling catalysts. More effective hydrogen utilization can be achieved, and the exclusion of light products made in the first hydroconversion stages from processing in downstream stages improves the latter operations. Additional advantages will become apparent from the description which follows.

In the attached drawings, FIGURE 1 is a flow diagram illustrating a three stage embodiment of the invention; and FIGURE 2 is a flow diagram illustrating a four stage embodiment of the invention. The various figures will be referred to and described in more detail hereinafter.

The feed to the process of this invention may be any residual oil, by which is meant oils boiling at least in large part above 1000° F. and containing asphaltic and other contaminants including metal compounds. Thus, the feed may be crude petroleum, atmospheric or vacuumreduced crude, residuum stripper bottoms, solvent extracted residuum fractions, or similar materials. Preferably, however, the feed oil is a vacuum-reduced crude from which the maximum amount of metal-free distillate oil has already been recovered, so that the oil boils substantially entirely above about 900° F.

In the first hydroconversion zone the residuum feed is treated with from 1,000 to 15,000 s.c.f./bbl. of hydrogen at elevated temperatures in the range 750–900° F., preferably from 825 to 875° F., and elevated pressure of at least about 1200 p.s.i.g., preferably of 2000 p.s.i.g. or higher, in a reaction vessel which is essentially a thermal soaking chamber. In this vessel the hot oil is held for sufficient time for appreciable thermal decomposition of the large molecules present to take place, particularly for thermal decomposition of metal compounds, and the vessel is run liquid continuous so that a maximum contact time may be achieved. The liquid continuous operation may be provided by passing the oil and hydrogen upwards through the reaction vessel, which has sufficiently broad cross-sectional area such that the hydrogen bubbles through a pool of liquid oil inducing eddy currents and substantial back-mixing. Advantageously, porous contact materials in the form of small particles are maintained in suspension in the oil as a slurried material on which decomposed metal compounds and other solids such as clay or silt may deposit. The contact materials desirably are particles of sulfactive hydrogenation catalyst for promoting the decomposition of metal compounds. The operating conditions specified promote thermal hydrocracking of the residuum, and the residence time is such that at least 30% of the entering residuum feed boiling above 900° F. is converted to distillates boiling below 900° F. A liquid oil effluent is withdrawn from the reaction vessel at substantially reaction chamber temperature and pressure, separately from a vapor effluent which contains the vaporized distillates produced.

In the embodiment where only three hydroconversion stages are used, the liquid oil effluent of the first stage is passed downflow through the second stage reaction vessel which comprises a vapor liquid contacting tower, sometimes referred to herein as a "catalytic hot stripper," operated at substantially the pressure of the first stage and at a temperature above 750° F. Hydrogen-rich gas is passed upwards through the contacting tower at a high flow rate of from 5,000 to 30,000 s.c.f./bbl. to effect a vigorous stripping action so as to remove distillates produced in the first stage which did not separate in the simple equilibrium flash separation, and to remove further quantities of distillates produced in the countercurrent zone. This second stage reaction zone is desirably provided with a sulfactive hydrogenation catalyst in the form of relatively large shaped particles permitting a high liquid flow velocity downwards sufficient to entrain any small particles carried over from the first stage. It is better, however, to exclude fine particles from entrainment in the oil as much as possible, as by passing the oil through a cyclone separator or similar device. The catalytic hot stripper is operated vapor continuous in order to achieve the maximum hydrogen partial pressure at the catalyst surfaces. A distillation separation of the unconverted feed and the hydrocracked products is accomplished as conversion progresses, so that the products are continuously evaporated and carried away in the hydrogen stream, and thus any unconverted oils remain in contact with the catalyst at maximum concentrations. Conversion in this stage is in the order of 30-60% of the entering material, and the remaining unvaporized and unconverted residual oil is in condition for recycling to the first hydroconversion zone or to the countercurrent catalytic stripper without depressuring for distillation.

In the embodiment where four hydroconversion stages are used, the countercurrent catalytic hot stripper is the third stage, and the second hydroconversion stage comprises essentially a continuation of the first stage reactions in a separate vessel wherein the liquid oil effluent of the first stage is passed as a discontinuous phase and hydrogen-containing gas is passed as the continuous phase. A more active sulfactive hydrogenation catalyst may be employed in the second stage, as compared to that employed in the first stage, when the first stage has been operated so as to effectively move most of the metal contaminants, clay, scale, salt, and like materials present in the residuum feed. The second stage catalyst in this embodiment may be provided as fixed beds of particles in the reactor. The effluent of this reaction stage is separated into vapor and liquid at substantially reaction zone temperature and pressure, and the liquid effluent is passed to the catalytic hot stripper just described.

The vapor phase effluent of the catalytic hot stripper is passed to the final hydroconversion zone comprising a reaction vessel containing a sulfactive hydrogenation catalyst which desirably has moderate hydrocracking activity so that further conversion of the high boiling distillates contained in the vapor to lower boiling distillates can be accomplished at a lower temperature of 750-850° F. at substantially the same elevated pressure used in the preceding zones. While the vaporized distillate in the feed to the final hydroconversion zone will be substantially free of metal contaminants and asphaltic materials, the vaporized oils will still include substantial quantities of organic sulfur and nitrogen compounds. Thus the catalyst employed must exhibit high activity in the presence of such contaminants. Suitable materials include combinations of Group VI and Group VIII metal sulfides associated with refractory inorganic oxide materials such as alumina, silica-alumina, silica-magnesia, and the like, including crystalline alumino-silicates. Where mixed inorganic oxides are employed to provide high surface area for the metal sulfides, the mixed oxides should not impart more than moderate acidic cracking activity to the catalyst, as resistance to the deactivating effects of sulfur and nitrogen compounds is often thereby lost.

Since the vapor phase feed passed to the last hydroconversion reaction zone includes all of the hydrogen supplied to the catalytic hot stripper not consumed in the hydrocracking reactions therein, additional hydrogen feed need not be supplied to the final stage. An excessively high vapor flow rate in the last hydroconversion stage is avoided by not permitting the vapor effluent of the first stage and the vapor effluent of any second stage prior to the catalytic hot stripper to pass through the last hydroconversion zone. Instead, the prior vapor effluents are cooled to condense normally liquid distillate oils contained therein, and to recover hydrogen-rich gas for recycling, and the condensed distillates are further treated to separate light distillates from the high boiling distillate oils contained therein, for example distillates boiling above about 600° F. The high boiling condensed distillates can then be passed to the final hydroconversion reaction zone as a liquid, thereby providing a liquid phase in the final reaction zone and also acting as a means for temperature control whereby the last hydroconversion zone can conveniently be operated at a lower temperature than the first and second hydroconversion zones and catalytic hot stripper. Thus, the hydrocracking conversion achieved in the final hydroconversion zone is primarily that promoted by the catalyst, whereas the hydrocracking accomplished in the preceding reaction zones was primarily thermal in nature, requiring temperatures generally above 800° F., the catalyst functioning primarily to hydrogenate and prevent coke formation.

Referring now to FIGURE 1, a residual oil such as vacuum reduced crude in line 11 is combined with 4,000 s.c.f./bbl. of hydrogen-rich gas supplied in line 12 and passed through furnace 13 and thence through lines 14 and 15 into a first hydroconversion reactor 16. A body of oil collects in reactor 16 through which the hydrogen-rich gas and vapor products of thermal hydrocracking bubble upwards, the vapors being then withdrawn from the top through line 17. Conditions in the reactor include temperature of about 840° F. and pressure of about 2500 p.s.i.g. About 40% of the feed is converted to distillates boiling below 900° F. and is withdrawn in the vapor of line 17. From near the top of vessel 16 the liquid phase is withdrawn through line 18, and at least a portion of the liquid phase representing the net liquid reaction effluent is passed through line 19 to catalytic hot stripper 22. Another portion of the liquid is recycled back to the first reaction zone through line 20 by means of pump 21. The amount recycled is about equal in volume to the amount of fresh feed. The continual circulation of liquid serves to keep in suspension small catalyst particles in reactor 16, some of which may be entrained in the liquid of line 18. The liquid withdrawn through line 19 and passed to zone 22 flows downward over ring-shaped catalyst surfaces and is contacted therein with 15,000 s.c.f./bbl. of upflowing hydrogen introduced hot through line 23. Conditions of temperature and pressure in stripper 22 are substantially similar to those used in reactor 16, but the more vigorous stripping action of the large amount of upflowing hydrogen effects a larger amount of hydroconversion and vaporization of distillate oils having end points as high as 950° F. These vapors are withdrawn from the top of reactor 22 through line 24. The distillates therein amount to another 40% of the original feed. The unconverted or unvaporized material is withdrawn from the bottom of stripper 22 through line 25, and at least a portion thereof representing the unconverted 20% of original feed is desirably withdrawn from the system through line 26 to prevent accumulation of unwanted solids in the process. Another portion may be recycled to the first hydroconversion zone by passing through line 27 and pump 21.

The vapors in line 24 are combined with liquid distillates in line 39, obtained as described hereinafter, and passed through line 28 into catalytic hydrocracking reaction zone 29. Reactor 29 contains several fixed beds of sulfactive hydrogenation catalyst, and is operated at a lower temperature of about 750° F. and substantially the same pressure as in the preceding zone. Mixed vapor and liquid flow is achieved, but the hydrogen-rich vapor comprises the continuous phase maintaining the high pressure. The feed to reactor 29 includes distillates boiling below and above 700° F. The light distillates and the heavy distillates are hydrogenated therein to convert most of the sulfur and nitrogen compounds, and about half of the heavy distillates are converted to light distillates so that the product oil boils mostly below about 700° F. The total reactor effluent in line 30 is combined with the vapors of line 17 which, as described, were obtained from the first hydroconversion reaction zone. The combined vapor effluents are cooled in exchanger 31 and passed to separator 32, from which the condensed normally liquid distillate oils are withdrawn through line 33. The distillates pass to distillation recovery facilities 34, wherein there are obtained light vapor by-products in line 35, light and middle distillates in line 36, and heavy distillates boiling from about 700° F. to as high as 950° F. in line 37. A portion of the heavy distillates may be withdrawn through line 38 if it is not desired to convert all of the material to distillates boiling as low as those withdrawn through line 36, but at least a portion is passed through line 39 containing pump 40 for return to the last hydroconversion reaction zone 29.

By operating in this manner more effective use of the hydrogen is made, and the desirable objective of excluding from the final hydroconversion zone the light distillates produced in the first reaction zone is accomplished. Also, a higher hydrogen purity may be obtained in the latter downstream hydroconversion zones, where this is particularly desirable. Thus, as shown, the effluent streams of lines 17 and 30 which are passed to separator 32 are relieved of hydrogen-rich gas which is withdrawn through line 42 and returned for reuse by means of compressor 43. A portion of this hydrogen-rich gas is recycled via line 12 to the first hydroconversion reaction zone, while another portion is passed through line 44, preheated in furnace 45 and introduced via line 23 into catalytic hot stripper 22. Make-up hydrogen in line 46 added to the material entering reactor 29 thus provides all of the net hydrogen consumption for all hydroconversion zones. As indicated, it is desirable to purge a portion of the hydrogen, for example through line 41 from separator 32, to prevent the buildup of light gaseous by-products. This stream may be beneficated by removal of light hydrocarbons, and enriched hydrogen returned to the reaction system.

Referring now to FIGURE 2, there is shown a four-stage embodiment of the invention which is particularly suitable for use when the residuum feed contains large amounts of metal compounds, silt, and other tramp material. As illustrated, a residuum oil feed in line 51 is passed by means of pump 52 through furnace 53 and line 54 into a first hydroconversion reaction zone 55 at elevated temperatures of 825–900° F. and pressure of 1500–4000 p.s.i.g. Preheated hydrogen-rich gas supplied in line 56 is combined with the residuum oil by line 57, if additional preheating of the hydrogen is desired, and/or by line 58 if regulation of the furnace outlet temperature is desired. Reaction zone 55 is equipped with means for circulating solid catalyst particles as a slurry, which means is shown schematically as a draft tube through which the oil and hydrogen are injected upwards. Catalyst particles suspended in the body of oil in reactor 55 are carried upwards in suspension through the draft tube, and then settle out through the body of oil, a portion thereof ultimately being again swept upwards and resuspended in the entering material. Fresh solid catalyst particles are desirably added through line 59, and spent or partially used particles containing adherent coke and metals are periodically or continuously withdrawn as a thick slurry through line 60. The catalyst particles can accumulate a deposit of metals greater than their own weight before activity is adversely effected, and the spent particles will accordingly be heavier than the added fresh particles. The lighter fresh particles will thus tend to be eluted away from the heavier spent particles and kept in suspension by the circulating liquid, only the most heavily contaminated particles settling out in the leg for withdrawal in line 60. This elution effect may be further aided by injecting upflowing liquid into the leg (not shown). A separation between vapor and liquid is effected at the top of vessel 55 so that a vapor effluent can be withdrawn through line 61 and a liquid effluent, from which most of the catalyst particles have settled out, can be withdrawn through line 62.

To the liquid oil effluent in line 62 is added hydrogen-rich gas supplied through line 63 and a hot recycle residual oil in line 64, and the combined streams are passed through line 65 into hydroconversion reaction zone 66. This reactor contains sulfactive hydrogenation catalyst particles in at least one fixed bed, which catalyst is desirably of high hydrogenation activity whereby a high conversion can be achieved without coking or solids formation. This is possible because most of the metals and tramp solids have already been removed in zone 55. The conditions of temperature and pressure in reactor 66, however, are substantially similar to those used in the preceding zone. A mixed liquid and vapor effluent is withdrawn from reactor 66 through line 67 and separated in vessel 68, without substantial cooling or depressuring, into a vapor phase containing vaporized distillates in line 69 and an unvaporized residual oil portion in line 70. At least a portion of the unvaporized residual oil passes via line 71 to catalytic hot stripper 72. Another portion of the material in line 70 may be passed through line 73 and line 64 as all or a portion of the heavy liquid recycle. The catalytic hot stripper 72 is operated as described in connection with FIGURE 1 employing upflowing stripping hydrogen supplied hot through line 74, whereby substantial further conversion and vaporization is achieved to obtain a vapor effluent in line 75. At least a portion of the oil must remain liquid for withdrawal through line 76. A portion of this unvaporized liquid can then be returned as recycle to the second hydroconversion zone through lines 77 and 64. Another portion can desirably be recycled to the first hydroconversion zone through lines 78 and 79. It is usually desirable to withdraw at least a small portion of this highest boiling and most refractory residual oil from the process through line 80. However, it has been found that nearly quantitative conversion to distillates can be achieved in the process, so that the amount withdrawn through line 80 need be only a small bleed stream sufficient to prevent insoluble solids of such small particle size as not to readily settle out in zone 55 from building up to concentrations where plugging could occur in zone 66.

The treatment of the vapor effluent of the first and second hydroconversion zones in FIGURE 2 is somewhat different than that illustrated in FIGURE 1. As shown in FIGURE 2, the vapor effluent of the first hydroconversion zone in line 61, and the vapor effluent of the second hydroconversion zone in line 69, are cooled in condenser 81 and passed through line 82 to separator 83. A portion of the noncondensable gases is withdrawn from the system through line 84 to control hydrogen purity while the major portion of the hydrogen-rich gas obtained in line 85 is recompressed in compressor 86, combined with make-up hydrogen added through line 87, and reheated in furnace 88. The hot hydrogen-rich gas stream in line 89 is then diverted in part through line 74 to the catalytic hydrostripper, in part through line 63 to the second hydroconversion zone, and in part through line 56 to the first hydroconversion zone. Thus, all of the reactors operate within the same high pressure envelope, though it will be understood that there is a moderate pressure drop in the direction of oil flow.

The distillates condensed from the vapor effluents of the first and second conversion zones and collected in separator 83, are passed through line 90 to distillation facilities 91, which operate at a lower pressure. Very light distillates are recovered through line 92, distillate gas oils can be withdrawn through line 93, and the highest boiling portion of the distillates produced in the first and second conversion zones, e.g., those boiling above about 700° F., are withdrawn through line 94. A portion thereof may be withdrawn for sale as heavy fuel oil or as cat cracker feed through line 95, but at least a portion is recycled through line 96 by means of pump 97 to the last hydroconversion reaction zone 99 in combination with the catalytic hot stripper vapor effluent of line 75 through line 98. As described previously in connection with FIGURE 1, in reactor 99 the light and heavy distillates are hydrogenated, and substantial conversion of heavy distillates to light distillates is accomplished. In the illustrated embodiment the final reaction stage effluent in line 100 passes through cooler 101 to separator 102. The condensed distillate oils are then withdrawn through line 104, for further treatment in processing and/or recovery facilities not shown, while the hydrogen-rich vapors are withdrawn through line 103 and combined with the other vapors passing via line 82 to separator 83. It will be observed that in this embodiment all of the distillate oils in the vapor effluent of the catalytic hot stripper are treated on a once-through basis in the final hydrocracking reaction zone and that only the highest boiling portion of the vapors produced in the first and second hydroconversion zones are similarly treated on a once-through basis in the final hydrocracking zone. Superior results are thereby obtainable as it is found that inclusion of the lighter distillate oils produced in the first and second hydroconversion zones in the feed to the final hydrocracking zone would have an adverse yield depressing effect on the conversion therein.

I claim:
1. A process for upgrading residual oil containing metal contaminants which comprises treating with hydrogen in at least three serially-connected hydroconversion stages operated at elevated temperature within a single high-pressure envelope in the sequence:
  (1) treating the whole residuum in a first hydroconversion stage comprising a reaction vessel through which liquid oil is passed as the continuous phase at elevated temperature and pressure sufficient to decompose said metal contaminants contained in said residuum and hydrogen-containing gas is passed as a discontinuous phase, and withdrawing separate liquid and vapor effluents;
  (2) treating liquid effluent of the first stage in a second hydroconversion stage comprising a reaction vessel through which liquid oil is passed as a discontinuous phase and hydrogen-containing gas is passed as the continuous phase, and maintaining said second stage at substantially the pressure of said first stage and temperature above 750° F.;
  (3) treating vapor effluent of a next-to-last stage, in the absence of liquid effluent of said next-to-last stage, in a last hydroconversion stage comprising a reaction vessel containing a sulfactive hydrogenation catalyst through which said vapor effluent is passed, maintaining said last stage at a temperature above 650° F. and hydrogen partial pressure above 1000 p.s.i.g., and cooling the effluent to obtain a vapor effluent and a liquid effluent;
    said next-to-last stage comprising a stripping reaction vessel wherein liquid effluent of a preceding stage is passed downward over catalytic surfaces and contacted countercurrently with upflowing hydrogen containing gas at substantially the pressure of the first stage and temperature above 750° F., and withdrawing separate liquid and vapor effluents;
  cooling vapor effluent of the first stage and vapor effluent of any second stage which is prior to the next-to-last stage to condense distillate oils contained therein;
  treating the highest boiling distillate portion so condensed in the last hydroconversion stage, said distillates by-passing all intervening stages, and the uncondensed portion and low boiling condensed distillates by-passing all stages subsequent to the stage from which derived;
  and separating liquid effluent obtained from the last stage into distillate fractions.

2. A residuum hydroconversion process which comprises:
  passing residuum and hydrogen concurrently through a first stage reaction zone comprising a reaction chamber at thermal hydrocracking conditions including temperature above 820° F., pressure above 1200 p.s.i.g., and residence time such that at least 30% of the entering residuum boiling above 900° F. is converted to distillates boiling below 900° F., and recovering a liquid oil effluent and a vapor effluent at substantially reaction chamber temperature and pressure,
  passing liquid oil effluent of said first stage downflow through a second stage reaction zone comprising a vapor-liquid contacting tower countercurrent to upflowing hydrogen-rich gas at substantially the pressure of said first stage and temperature above 750° F., whereby the overhead vapor effluent of said second stage includes vaporized distillate oil boiling above 800° F.,
  passing overhead vapor effluent of said second stage through a third stage reaction zone comprising a reaction chamber containing a sulfactive hydrogenation catalyst at catalytic hydroconversion conditions including temperature above 650° F. and hydrogen partial pressure above 1000 p.s.i.a. whereby there is obtained additional conversion to distillate oil boiling below 800° F.,
  recovering hydrogen-rich gas contained in the vapor effluent of said first stage and in the effluent of said third stage separately from normally-liquid distillate oils contained therein,
  and passing the highest boiling portion of distillate oil recovered from the vapor effluent of said first stage through said third stage.

3. The process of claim 2 wherein the effluent of said first stage is separated into a vapor portion and a liquid portion at substantially the thermal hydrocracking temperature and pressure, the vapor portion is combined with the effluent of said third stage and cooled to separate normally liquid distillate oil contained therein from hydrogen-rich gas, and a highest boiling portion of said distillate boiling in the range of distillates contained in the vapor effluent of said second stage is passed to said third stage.

4. The process of claim 2 wherein the reaction chamber of said first stage contains a sulfactive hydrogenation catalyst in at least one fixed bed through which residuum and hydrogen pass.

5. The process of claim 2 wherein the contacting tower of said second stage contains a sulfactive hydrogenation catalyst in at least one fixed bed through which liquid residuum effluent of said first stage and hydrogen pass countercurrently.

6. The process of claim 2 wherein each of said first second, and third stages contains sulfactive hydrogenation catalyst, the catalyst in said third stage has hydrocracking activity, and the catalysts in said first and second stages have no more than weak hydrocracking activity.

7. The process which comprises passing a heavy liquid residual oil and hydrogen through a pretreating reaction zone to contact therein high porosity solid particles at elevated temperature and pressure sufficient to decompose metal contaminants contained in said oil, and separating the effluent into liquid and vapor;

passing liquid effluent of said pretreating zone and hydrogen through a thermal hydrocracking zone at elevated temperature and pressure and long reaction time achieved by recycling unconverted liquid, to convert a substantial portion of the oil feed to vaporized distillates, and separating the effluent into liquid and vapor;

passing liquid effluent of the thermal hydrocracking zone to a catalytic hot stripper at elevated temperature and pressure and therein stripping the liquid with hydrogen containing gas to convert a further portion of the oil feed to vaporized distillates and withdrawing separate liquid and vapor effluents;

passing vapor effluent of the countercurrent catalytic hot stripper in the absence of liquid effluent of said stripper through a catalytic hydrogenation zone to contact therein a sulfactive hydrogenation catalyst at elevated temperature and pressure;

and recovering the distillates produces from the vapor effluents of said pretreating zone, said thermal hydrocracking zone, and said hydrogenation zone, said vapor effluents of said pretreating zone and said thermal hydrocracking zone bypassing all stages subsequent to the stage from which they were respectively derived.

References Cited

UNITED STATES PATENTS

| | | | |
|---|---|---|---|
| 2,706,705 | 4/1955 | Oettinger et al. | 208—59 |
| 3,260,663 | 7/1966 | Inwood et al. | 208—59 |

ABRAHAM RIMENS, *Primary Examiner.*

DELBERT E. GANTZ, *Examiner.*